(12) United States Patent
Lochhaas et al.

(10) Patent No.: US 9,711,816 B2
(45) Date of Patent: Jul. 18, 2017

(54) LOW EQUIVALENT WEIGHT POLYMERS

(75) Inventors: Kai H. Lochhaas, Neuotting (DE); Steven J. Hamrock, Stillwater, MN (US); Klaus Hintzer, Kastl (DE)

(73) Assignee: 3M Innovative Properties Company, St. Paul, MN (US)

( * ) Notice: Subject to any disclaimer, the term of this patent is extended or adjusted under 35 U.S.C. 154(b) by 589 days.

(21) Appl. No.: 14/234,464

(22) PCT Filed: Jul. 27, 2012

(86) PCT No.: PCT/US2012/048532
§ 371 (c)(1),
(2), (4) Date: Jan. 23, 2014

(87) PCT Pub. No.: WO2013/019614
PCT Pub. Date: Feb. 7, 2013

(65) Prior Publication Data
US 2014/0141357 A1 May 22, 2014

Related U.S. Application Data

(60) Provisional application No. 61/514,938, filed on Aug. 4, 2011.

(51) Int. Cl.
*C08F 214/18* (2006.01)
*H01M 8/102* (2016.01)
(Continued)

(52) U.S. Cl.
CPC ........... *H01M 8/102* (2013.01); *C08F 214/18* (2013.01); *C08J 5/2237* (2013.01); *C08L 41/00* (2013.01);
(Continued)

(58) Field of Classification Search
USPC ............................................. 429/482; 521/38
See application file for complete search history.

(56) References Cited

U.S. PATENT DOCUMENTS 3,310,606 A * 3/1967 Fritz ....................... C08F 16/24
525/276
4,940,525 A 7/1990 Ezzell
(Continued)

FOREIGN PATENT DOCUMENTS

EP 1167400 4/2008
EP 1167400 B1 * 4/2008
(Continued)

OTHER PUBLICATIONS

Buchi, "Performance of Differently Cross-Linked, Partially Fluorinated Proton Exchange Membranes in Polymer Electrolyte Fuel Cells", J. Electrochem. Soc., Sep. 1995, vol. 142, No. 9, pp. 3044-3048.
(Continued)

*Primary Examiner* — Mark Kaucher
*Assistant Examiner* — Henry Hu
(74) *Attorney, Agent, or Firm* — Julie Lapos-Kuchar

(57) ABSTRACT

Described herein is a composition comprising: a polymer derived from (a) a fluorinated olefin monomer; (b) a highly fluorinated sulfur-containing monomer of the formula: $CX^1X^2=CX^3[(CX^4X^5)_w-O-R^1-SO_2Y]$ where $X^1$, $X^2$, $X^3$, $X^4$, and $X^5$ are independently selected from H, Cl, or F; w is 0 or 1; $R^1$ is a non-fluorinated or fluorinated alkylene group; and Y is selected from F, Cl, Br, I, or OM, where M is a cation; and (c) a polyfunctional monomer comprising at least two functional groups, wherein the functional groups are selected from the group consisting of: (i) a fluorovinyl ether group, (ii) a fluoroallyl ether group, (iii) a fluorinated olefinic group, and (iv) combinations thereof; articles thereof; and a method of making such polymers.

19 Claims, 2 Drawing Sheets

(51) Int. Cl.

| | | |
|---|---|---|
| *C08L 41/00* | (2006.01) | |
| *H01M 8/1032* | (2016.01) | |
| *H01M 8/1039* | (2016.01) | |
| *H01M 8/1023* | (2016.01) | |
| *H01M 8/1072* | (2016.01) | |
| *H01M 8/1086* | (2016.01) | |
| *C08J 5/22* | (2006.01) | |
| *H01M 8/1051* | (2016.01) | |

(52) U.S. Cl.
CPC ......... *H01M 8/109* (2013.01); *H01M 8/1023* (2013.01); *H01M 8/1032* (2013.01); *H01M 8/1039* (2013.01); *H01M 8/1051* (2013.01); *H01M 8/1072* (2013.01); H01M 2300/0082 (2013.01); *Y02P 70/56* (2015.11)

(56) References Cited

U.S. PATENT DOCUMENTS

| | | |
|---|---|---|
| 5,190,813 A | 3/1993 | Ohashi |
| 5,264,508 A | 11/1993 | Ishibe |
| 5,310,765 A | 5/1994 | Banerjee |
| 5,463,005 A | 10/1995 | Desmarteau |
| 6,090,895 A | 7/2000 | Mao |
| 6,624,328 B1 | 9/2003 | Guerra |
| 6,979,699 B2 | 12/2005 | Wlassics |
| 7,060,738 B2 | 6/2006 | Jing |
| 7,060,756 B2 | 6/2006 | Jing |
| 7,071,271 B2 | 7/2006 | Thaler |
| 7,074,841 B2 | 7/2006 | Yandrasits |
| 7,112,614 B2 | 9/2006 | Jing |
| 7,265,162 B2 | 9/2007 | Yandrasits |
| 7,348,088 B2 | 3/2008 | Hamrock |
| 7,514,481 B2 | 4/2009 | Yandrasits |
| 7,671,112 B2 | 3/2010 | Hintzer |
| 7,847,035 B2 | 12/2010 | Jing |
| 7,943,249 B2 * | 5/2011 | Kawazoe ........... B01D 67/0011 427/115 |
| 2001/0031388 A1 | 10/2001 | Hamrock |
| 2005/0107490 A1 | 5/2005 | Yandrasits |
| 2006/0014887 A1 * | 1/2006 | Hamrock ............... C08J 5/2237 524/544 |
| 2006/0063054 A1 | 3/2006 | Frey |
| 2007/0015937 A1 | 1/2007 | Hintzer |
| 2007/0099052 A1 | 5/2007 | Frey |
| 2007/0099053 A1 * | 5/2007 | Frey ...................... C08J 5/2237 429/483 |
| 2007/0185220 A1 | 8/2007 | Lochhaas |
| 2007/0202377 A1 | 8/2007 | Hommura et al. |
| 2008/0032052 A1 * | 2/2008 | Kourtakis ............. C08K 5/0025 427/387 |
| 2008/0131776 A1 * | 6/2008 | Sakuma ................ C08F 259/08 429/217 |
| 2009/0169959 A1 | 7/2009 | Pierpont et al. |
| 2014/0039130 A1 * | 2/2014 | Murai ................. C08F 214/184 525/387 |

FOREIGN PATENT DOCUMENTS

| | | |
|---|---|---|
| JP | S53-29291 | 3/1978 |
| JP | 55-160030 | * 12/1980 |
| JP | 1995-324114 | 6/1997 |
| JP | 2001-185164 | 7/2001 |
| JP | 2002-334707 | 11/2002 |

OTHER PUBLICATIONS

Emery, "The Development of New Membranes for Proton Exchange Membrane Fuel Cells", ECS Transactions, 2007, vol. 11, No. 1, pp. 3-14.

International Search Report for PCT International Application No. PCT/US2012/048532 Mailed on Feb. 1, 2013, 4 pages.

\* cited by examiner

LOW EQUIVALENT WEIGHT POLYMERS

CROSS REFERENCE TO RELATED APPLICATIONS

This application is a national stage filing under 35 U.S.C. 371 of PCT/US2012/048532, filed Jul. 27, 2012, which claims priority to U.S. Provisional Application No. 61/514,938, filed Aug. 4, 2011, the disclosure of which is incorporated by reference in its/their entirety herein.

U.S. GOVERNMENT RIGHTS

This disclosure was made with Government support under Grant Number DE-FG36-07GO17006 awarded by DOE. The Government has certain rights in this disclosure

TECHNICAL FIELD

A polymer comprising low equivalent weight and a method of making is described.

BACKGROUND

A typical fuel cell system includes a power section in which one or more fuel cells generate electrical power. A fuel cell is an energy conversion device that converts hydrogen and oxygen into water, producing electricity and heat in the process. Each fuel cell unit may include a proton exchange membrane (PEM) at the center with gas diffusion layers on either side of the PEM. Anode and cathode catalyst layers are respectively positioned at the inside of the gas diffusion layers. This unit is referred to as a membrane electrode assembly (MEA). Separator plates or flow field plates are respectively positioned on the outside of the gas diffusion layers of the membrane electrode assembly. This type of fuel cell is often referred to as a PEM fuel cell.

In a fuel cell there is a desire for the polymer of the PEM to have a low equivalent weight, thus having many sites for proton exchange. However, traditionally the low equivalent weight polymers do not have sufficient physical properties to make them useful in membrane materials.

It is a common practice in the industry to use uncrosslinked sulfonated polymers in PEMs, such as those sold under the trade designation "NAFION" (DuPont Chemicals, Inc., Wilmington, Del.), which is made of copolymers of tetrafluoroethylene and perfluorovinylether sulfonic acid. However, these commercially available PEMs are not entirely satisfactory in meeting the performance demands of fuel cells. For example, NAFION membranes with lower equivalent weight can achieve lower electrical resistance, but these membranes are also structurally weaker.

SUMMARY

There is a desire to create a polymer having a low equivalent weight, which can be easily processed and has sufficient mechanical properties.

In one aspect, a composition is disclosed comprising a polymer derived from (a) a fluorinated olefin monomer; (b) a highly fluorinated sulfur-containing monomer of the formula:

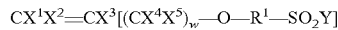

where $X^1$, $X^2$, $X^3$, $X^4$, and $X^5$ are independently selected from H, Cl, or F; w is 0 or 1; $R^1$ is a fluorinated divalent carbon-containing group, optionally comprising oxygen atoms; and Y is selected from F, Cl, Br, I, or OM, where M is a cation; and (c) a polyfunctional monomer comprising at least two functional groups, wherein the functional groups are selected from the group consisting of: (i) a fluorovinyl ether group, (ii) a fluoroallyl ether group, (iii) a fluorinated olefinic group, and (iv) combinations thereof.

In one embodiment, the polyfunctional monomer is selected from from the group consisting of: $CF_2{=}CF{-}O{-}(CF_2)_b{-}O{-}CF{=}CF_2$; $CF_2{=}CFCF_2{-}O{-}(CF_2)_b{-}O{-}CF_2CF{=}CF_2$; $CF_2{=}CF{-}CF_2{-}O{-}(CF_2)_b{-}O{-}CF{=}CF_2$; and $CF_2{=}CF{-}(CF_2)_m{-}O{-}R{-}O{-}(CF_2)_e{-}CF{=}CF_2$, where b is 2-10, m is 0-2, e is 0-2 and R is an aryl or fluorinated aryl.

In another embodiment, the polyfunctional monomer is
$CF_2{=}CF{-}(CF_2)_z{-}O{-}[CF(CF_3)CF_2{-}O]_a(CF_2)_b{-}[(CF_2)_c{-}O]_d{-}[CF(CF_3)CF_2{-}O]_a{-}(CF_2)_eCF{=}CF_2$
where z is 0-5; a is 0-5; b is 0-5; c is 0-5; d is 0-5, and e is 0-5; and wherein a+b+c+d≥1.

In another embodiment, the polyfunctional monomer is a fluorinated bisolefin selected from at least one of: $R_1R_2C{=}CX^6{-}(CF_2)_k{-}CX^7{=}CR_3R_4$, where k is 2-10; $X^6$ and $X^7$ are each independently selected from H, F, Cl, or a non-fluorinated or fluorinated methyl group; and $R_1$, $R_2$, $R_3$, and $R_4$ are each independently selected from H, Cl, or a C1-C5 alkyl group.

In another aspect, an article is disclosed comprising the polymer derived from (a) a fluorinated olefin monomer; (b) a highly fluorinated sulfur-containing monomer of the formula:

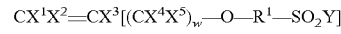

where $X^1$, $X^2$, $X^3$, $X^4$, and $X^5$ are independently selected from H, Cl, or F; w is 0 or 1; $R^1$ is a fluorinated divalent carbon-containing group, optionally comprising oxygen atoms; and Y is selected from F, Cl, Br, I, or OM, where M is a cation; and (c) a polyfunctional monomer, wherein the functional group is selected from the group consisting of (i) a fluorovinyl ether group, (ii) a fluoroallyl ether group, (iii) a fluorinated olefinic group, and (iv) combinations thereof.

In another aspect, a fuel cell is described comprising a membrane electrode assembly made from the polymer derived from (a) a fluorinated olefin monomer; (b) a highly fluorinated sulfur-containing monomer of the formula:

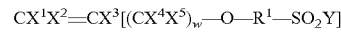

where $X^1$, $X^2$, $X^3$, $X^4$, and $X^5$ are independently selected from H, Cl, or F; w is 0 or 1; $R^1$ is a fluorinated divalent carbon-containing group, optionally comprising oxygen atoms; and Y is selected from F, Cl, Br, I, or OM, where M is a cation; and (c) a polyfunctional monomer, wherein the functional group is selected from the group consisting of (i) a fluorovinyl ether group, (ii) a fluoroallyl ether group, (iii) a fluorinated olefinic group, and (iv) combinations thereof.

In yet another aspect, a method is described comprising: (I) providing a mixture comprising (a) a fluorinated olefin monomer; (b) a highly fluorinated sulfur-containing monomer of the formula: $CX^1X^2{=}CX^3[(CX^4X^5)_w{-}O{-}R^1{-}SO_2Y]$ where $X^1$, $X^2$, $X^3$, $X^4$, and $X^5$ are each independently selected from H, Cl, or F; w is 0 or 1; $R^1$ is a fluorinated divalent carbon-containing group, optionally comprising oxygen atoms; and Y is selected from F, Cl, Br, I, or OM; and (c) a polyfunctional monomer, wherein the functional group is selected from the group consisting of (i) a fluorovinyl ether group, (ii) a fluoroallyl ether group, (iii) a fluorinated olefinic group, and (iv) combinations thereof; and (II) polymerizing the mixture to form a polymer.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term

Figure 1:
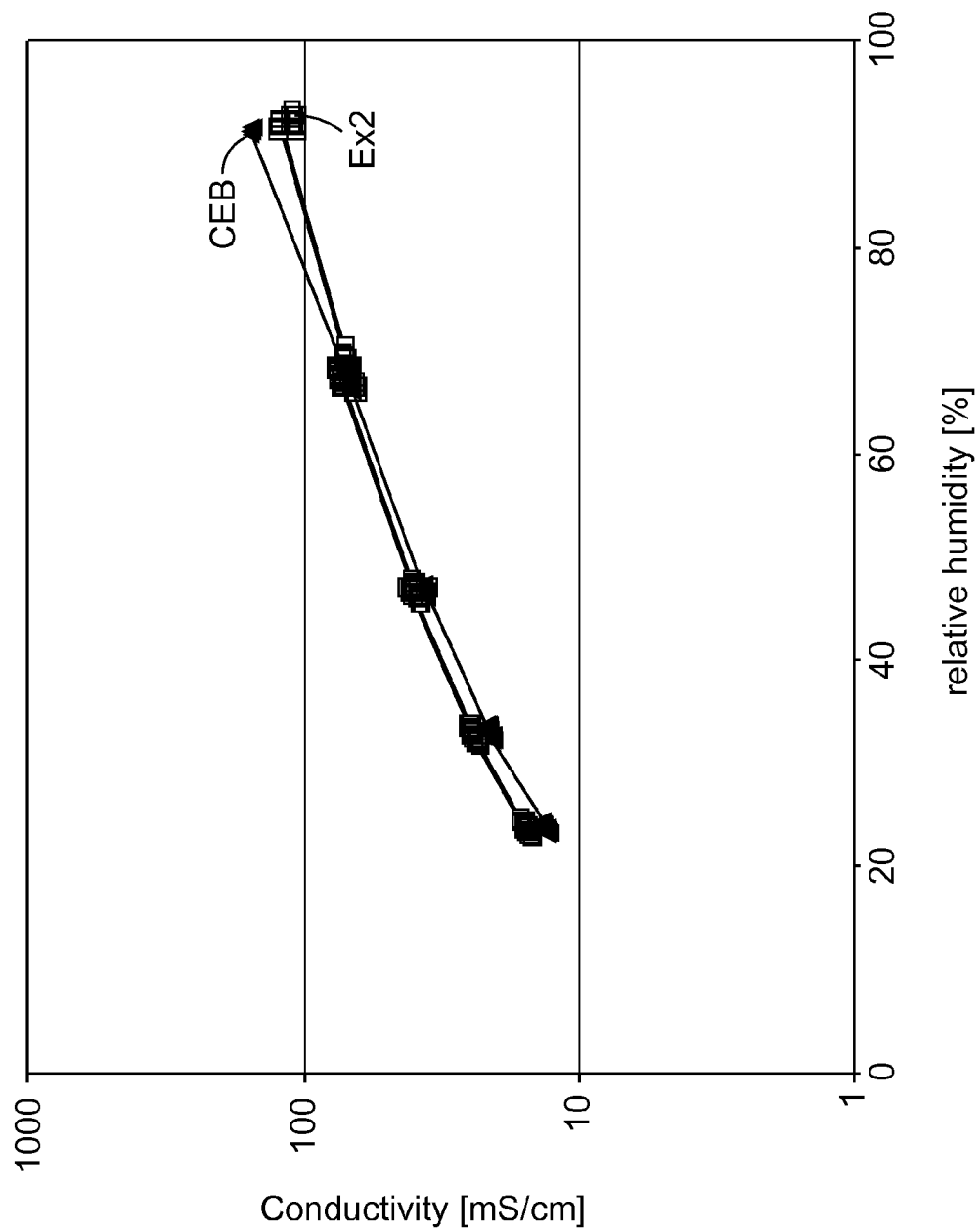
FIG. 1 a graph of conductivity versus % relative humidity for Example 2 and Comparative Example B.

"a", "an", and "the" are used interchangeably and mean one or more; and

"and/or" is used to indicate one or both stated cases may occur, for example A and/or B includes, (A and B) and (A or B);

"bisolefin" means that the compound comprises two double bonds, but does not comprise any allyl ether or vinyl ether groups;

"highly fluorinated" refers to a compound wherein at least 75%, 80%, 85%, 90%, 95%, or even 99% of the C—H bonds are replaced by C—F bonds, and the remainder of the C—H bonds are selected from C—H bonds, C—Cl bonds, C—Br bonds, and combinations thereof;

"perfluorinated" refers to a compound wherein all C—H bonds are replaced by C—F bonds;

"equivalent weight" means the mass of a given substance, which will neutralize one equivalent of base; and "polymer" and "polymeric material" refer materials prepared from two or more monomers such as a copolymer, terpolymer, or the like. Likewise, the term "polymerize" refers to the process of making a polymeric material that can be a copolymer, terpolymer, or the like.

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

The composition of the present disclosure is directed towards a polymer having a low equivalent weight, which is processable and has good mechanical properties.

High conductivity in a proton exchange membrane requires a high ratio of acidic sites in the membrane, i.e., a low equivalent weight per acid group. Unfortunately, polymers with low equivalent weight are generally soluble in water and methanol, and thus are not of practical use in many electrochemical cell applications such as in fuel cells. Low equivalent weight polymers, e.g. produced by copolymerizing larger amounts of vinylethers containing $SO_2X$-functionality might end up in low molecular weight polymers, which further degrade the mechanical properties. Crosslinking of linear polymers into a three dimensional network greatly reduces solubility of the low equivalent weight polymer membrane in water and methanol, reduces swelling of the membranes, and decreases shrinkage and expansion of the membrane in response to varying humidity. However, crosslinking of perfluorinated polymers is difficult and crosslinking during the polymerization process is thought to give intractable material and or gelling.

In the present disclosure, it has been discovered that by using a difunctional monomer polymerized with a sulfur-containing monomer and a fluorinated olefin monomer, a processable, low equivalent weight fluoropolymer with improved mechanical properties may be achieved for use, for example in fuel cell applications.

The composition of the present disclosure is a polymer derived from a fluorinated olefin monomer, a highly fluorinated sulfur-containing monomer, and a polyfunctional monomer. In other words, the composition of the present disclosure comprises interpolymerized monomers, preparable by polymerizing monomers comprising at least a fluorinated olefin monomer, a highly fluorinated sulfur-containing monomer, and a polyfunctional monomer, which then form a polymer.

The fluorinated olefins used in the present disclosure are alkenes comprising at least one double bond. These fluorinated olefins are preferred in polymers used in electrochemical applications because of their chemical stability. Perfluorinated olefin monomers are preferred, however highly fluorinated olefin monomers may also be used. Exemplary fluorinated olefin monomers include tetrafluoroethylene (TFE), vinylidene fluoride (VDF), chlorotrifluoroethene (CTFE), hexafluoropropylene (HFP), and perfluorinated vinylethers, such as perfluoropropylvinylether (PPVE), and perfluoromethylvinylether (PMVE).

The polymers of the present disclosure are derived primarily from fluorinated olefin monomers. Typically, the polymer of the present disclosure is derived from at least 65 mole %, 75 mole %, 80 mole % or even 90 mole % of a fluorinated olefin monomer.

In the present disclosure, the sulfur-containing monomer is used to provide ionic groups, enabling the resulting polymer to transfer ions. These sulfur-containing monomers may contain an ionic end group, such as $SO_3^-$ or may be ion-containing precursors, such as $SO_2F$, wherein the precursor group is converted to an ionic end group, as will be discussed later.

In one embodiment, the sulfur-containing monomer is of the following formula:

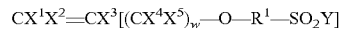

where $X^1$, $X^2$, $X^3$, $X^4$, and $X^5$ are independently selected from H, Cl, or F; w is 0 or 1. $R^1$ is a fluorinated divalent carbon-containing group, for example a partially fluorinated or fully fluorinated alkylene group, and optionally comprising oxygen atoms. In one embodiment $R^1$ comprises catenary oxygen atoms. Y is selected from F, Cl, Br, I, or OM, where M is a cation. The cation, M, may be $H^+$, an inorganic cation including, but not limited to: $Na^+$, $Li^+$, $Cs^+$, $Ca^{2+}$, $K^+$, $NH_4^+$, $Mg^{2+}$, $Zn^{2+}$, and $Cu^{2+}$, and/or an organic cation including, but not limited to $N(CH_3)_4^+$, $NH_2(CH_3)_2^+$, $N(CH_2CH_3)_4^+$, $NH(CH_2CH_3)_3^+$, $NH(CH_3)_3^+$, $(CH_3CH_2CH_2CH_2)_4P^+$, and a quaternary or protonated tertiary cyclic amines.

The sulfur-containing monomer is highly fluorinated or perfluorinated. Exemplary sulfur-containing monomer may be of the following formula:

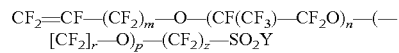

where m is 0 or 1; n is 0-5; r is 1-9; p is 0-5, z is 1-10, and Y is selected from F, Cl, Br, I, or OM, wherein M is a cation as defined above.

In one embodiment, the sulfur-containing monomer is selected from at least one of: $CF_2$=CF—O—$(CF_2)_z$—$SO_2F$; $CF_2$=$CFCF_2$—O—$(CF_2)_z$—$SO_2F$; $CF_2$=CF—O—

$CF_2CF(CF_3)$—O—$(CF_2)_z$—$SO_2F$, and $CF_2$=$CFCF_2$—O—$CF(CF_3)CF_2$—O—$(CF_2)_z$—$SO_2F$, or hydrolyzed versions thereof, wherein z is 1-10. Such hydrolyzed versions may be in the free acid or salt form (e.g., sodium, potassium, lithium, calcium, ammonium, etc.), and include for example, $CF_2$=$CF$—O—$(CF_2)_z$—$SO_3H$ (free acid form) and $CF_2$=$CF$—O—$(CF_2)_z$—$SO_3K$ (salt form).

Typically, 5-40 mole % or even 10-35 mole % of the sulfur-containing monomer is used versus the total monomer added.

In the present disclosure, the polyfunctional monomer is used to introduce cross-linking and/or branching into the polymer during polymerization. This cross-linking and/or branching is believed to be responsible for the enhanced physical properties observed in the polymers of the present disclosure. Although not wanting to be bound by theory, it is believed that the addition of a small amount of the polyfunctional monomer during the polymerization, enables the polymer to obtain some branching thought to give the polymer a higher molecular weight. However, branching and/or partial crosslinking of the polymer is low enough, such that the dispersion can still be coagulated and processed into articles. As previously mentioned, it was previously believed that crosslinking during polymerization would lead to an intractable dispersion and/or a gel.

The polyfunctional monomer comprises at least two functional groups, wherein the functional group is selected from (i) a fluorovinyl ether group, (ii) a fluoroallyl ether group, (iii) a fluorinated olefinic group, and combinations thereof. In one embodiment, the functional groups in the polyfunctional monomer are the same, i.e., both functional groups are a fluorinated olefin group, which may be the same or a different fluorinated olefin group. In another embodiment, the functional groups in the polyfunctional monomer are different, i.e., one functional group is a fluorinated olefin group and the other is a fluorovinyl ether group.

In one embodiment, the polyfunctional monomer is a perfluorodivinyl- or a perfluorodiallyl alkylether, or mixed perfluorovinyl/perfluoroallyl alkylethers. Exemplary a perfluorodivinyl/perfluorodiallyl alkylether include: $CF_2$=$CF$—O—$(CF_2)_b$—O—$CF$=$CF_2$; $CF_2$=$CFCF_2$—O—$(CF_2)_b$—O—$CF_2CF$=$CF_2$; $CF_2$=$CF$—$CF_2$—O—$(CF_2)_b$—O—$CF$=$CF_2$; and $CF_2$=$CF$—$(CF_2)_m$—O—R—O—$(CF_2)_e$—$CF$=$CF_2$, where b is 2-10, m is 0-2, e is 0-2, and R is an aryl or fluorinated aryl.

In another embodiment, the polyfunctional monomer is selected from: $CF_2$=$CF$—$(CF_2)_z$—O—$(CF(CF_3)$—$CF_2$—O$)_a(CF_2)_b$—(—$[CF_2]_c$—O$)_d$—$(CF(CF_3)$—$CF_2$—O$)_a$—$(CF_2)_e$—$CF$=$CF_2$ wherein z is 0-5; a is 0-5; b is 0-5; c is 0-5; d is 0-5, and e is 0-5, and wherein a+b+c+d≥1.

In yet another embodiment, the polyfunctional monomer is a fluorinated bisolefin. Exemplary fluorinated bisolefins include: $R^1R^2C$=$CX^6$—$(CF_2)_k$—$CX^7$=$CR^3R^4$, where k is 2-10; $X^6$ and $X^7$ are independently selected from H, F, Cl, or a non-fluorinated or fluorinated methyl group; and R', $R^2$, $R^3$, and $R^4$ are independently selected from H, Cl, or a C1-C5 alkyl group and wherein the bisolefin comprises at least one fluorine atom. In one embodiment, the fluorinated bisolefin is highly-fluorinated or perfluorinated.

The polyfunctional monomer is added in at least 0.01, 0.02, 0.05, 0.1, 0.2, or even 0.5 mol % of the polyfunctional monomer versus the total monomer present, and is added in at most 1, 2, 4, 5, 8, 10, or even 12 mol % of the polyfunctional monomer versus the total monomer present.

In one embodiment, the polyfunctional monomer comprises at least one fluorovinyl ether group and one fluorinated olefinic group such as $CF_2$=$CF$—O—$(CF_2)_n$—$CF$=$CF_2$ where n is 1 to 10. In one embodiment, the polyfunctional monomer comprises at least one fluorovinyl ether group and one fluoroallyl ether group such as $CF_2$=$CF$—$(CF_2)_n$—O—$CF_2CF$=$CF_2$ where n is 2 to 10. In yet another embodiment, the polyfunctional monomer comprises at least one fluoroallyl ether group and one fluorinated olefinic group such as $CF_2$=$CF$—$(CF_2)_n$—O—$CF_2CF$=$CF_2$ where n is 1 to 10.

The fluorinated olefin monomer, a sulfur-containing monomer, and a polyfunctional monomer are then polymerized to form a polymer. The polymers of the present invention are not graft polymerized polymers. In other words, the fluorinated olefin monomer; the sulfur-containing monomer; and the polyfunctional monomer are polymerized in the same kettle at the same time, resulting in a branched polymer. However, if a sufficient amount of polyfunctional monomer is used during polymerization the polymer may become crosslinked, wherein 100% of the polymer chains are linked to one another forming a network. These polymers are differentiated from a grafted polymer of these monomers, where in graft polymerization, the polymer backbone comprises the fluorinated olefin monomer and the sulfur-containing monomer and in a subsequent step the polyfunctional monomer is a side-chain is grafted off the polymer backbone.

The polymers of the present disclosure may be made by any suitable method, including emulsion polymerization, polymerization in supercritical carbon dioxide, solution or suspension polymerization, and the like, which are known in the art.

The aqueous (emulsion) polymerization systems may optionally comprise auxiliaries such as buffers, complex-formers or chain-transfer agents. The polymerization can be carried out at any suitable pH. pH is typically not critical, but depends on the initiator system used. To avoid on going conversion of the $SO_2F$-unit into the salt-form during polymerization, the pH is typically pH 1 to 7, more typically pH 1 to 6.

The polymerization to form the polymers of this disclosure can be conducted in an aqueous system using a water soluble initiator, for example an inorganic peroxide such as ammonium persulfate or an organic peroxide such as disuccinoyl peroxide. An initiator such as a di(perfluoroacyl) peroxide can also be used in an aqueous polymerization. About 0.0001 moles to about 0.2 moles of initiator is used per mol of the monomer which is present in the greatest quantity. An aqueous polymerization can be carried out at a pH of about 8 or lower, at a temperature of about 20° C. to about 110° C. and a pressure of about 0.01 MPa to about 5 MPa. It may also involve use of a hydrogen-containing chain transfer agent. A fluorocarbon solvent such as a C1-C4 chlorofluoroalkane may also be used, but if so, the initiator can be soluble in such solvent. A dispersing agent such as an ammonium salt of a long-chain perfluorocarbon acid such as ammonium perfluorocaprylate may be used if desired.

The polymerization can also be conducted entirely in a perfluorocarbon solvent, for example a perfluoroalkane such as perfluoroheptane, or a perfluorocycloalkane such as perfluroodimethylcyclobutane. A perfluorinated free radical initiator such as a perfluoroperoxide or a nitrogen fluoride is frequently used. About 0.0001 moles to about 0.2 moles of initiator is used per mole of the monomer which is present in the greatest quantity. The process may be run at a temperature of about −50° C. to about 200° C. and a pressure of about 0.01 MPa (mega Pascals) to about 5 MPa. Polymerization may also be run in bulk where excess liquid monomer is used as the solvent.

When used, an emulsifier is typically used in amount of 0.001% by weight to 1% by weight based on the total amount of water. Suitable emulsifiers include any fluorinated emulsifier commonly employed in aqueous emulsion polymerization. Particularly preferred emulsifiers are those that correspond to the general formula:

Y—$R_f$-Z-M wherein Y represents hydrogen, Cl or F; $R_f$ represents a linear or branched perfluorinated alkylene having 4 to 10 carbon atoms; Z represents $COO^-$ or $SO_3^-$ and M represents an alkali metal ion or an ammonium ion. Exemplary emulsifiers include: ammonium salts of perfluorinated alkanoic acids, such as perfluorooctanoic acid and perfluorooctane sulphonic acid.

Also contemplated for use in the preparation of the polymers described herein are emulsifiers of the general formula:

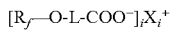

$[R_f—O-L-COO^-]_i X_i^+$ wherein L represents a linear partially or fully fluorinated alkylene group or an aliphatic hydrocarbon group, $R_f$ represents a linear partially or fully fluorinated aliphatic group or a linear partially or fully fluorinated group interrupted with one or more oxygen atoms, $X_i^+$ represents a cation having the valence i and i is 1, 2 and 3. In case the emulsifier contains partially fluorinated aliphatic group it is referred to as a partially fluorinated emulsifier.

Specific examples are described in, for example, US Pat. Publ. 2007/0015937 (Hintzer et al.). Exemplary emulsifiers include: $CF_3CF_2OCF_2CF_2OCF_2COOH$, $CHF_2(CF_2)_5COOH$, $CF_3(CF_2)_6COOH$, $CF_3O(CF_2)_3OCF(CF_3)COOH$, $CF_3CF_2CH_2OCF_2CH_2OCF_2COOH$, $CF_3O(CF_2)_3OCHFCF_2COOH$, $CF_3O(CF_2)_3OCF_2COOH$, $CF_3(CF_2)_3(CH_2CF_2)_2CF_2CF_2CF_2COOH$, $CF_3(CF_2)_2CH_2(CF_2)_2COOH$, $CF_3(CF_2)_2COOH$, $CF_3(CF_2)_2(OCF(CF_3)CF_2)OCF(CF_3)COOH$, $CF_3(CF_2)_2(OCF_2CF_2)_4OCF(CF_3)COOH$, $CF_3CF_2O(CF_2CF_2O)_3CF_2COOH$, and their salts. In one embodiment, the molecular weight of the emulsifier, preferably a partially fluorinated emulsifier, is less than 1500, 1000, or even 500 grams/mole.

These emulsifiers may be used alone or in combination as a mixture of two or more of them. The amount of the emulsifier is well below the critical micelle concentration, generally within a range of from 250 to 5,000 ppm (parts per million), preferably 250 to 2000 ppm, more preferably 300 to 1000 ppm, based on the mass of water to be used. Within this range, the stability of the aqueous emulsion should be improved. In order to further improve the stability of the aqueous emulsion, it may be preferred to add an emulsifier during the polymerization.

The aqueous emulsion polymerization may be initiated with a free radical initiator or a redox-type initiator. Any of the known or suitable initiators for initiating an aqueous emulsion polymerization of TFE can be used. Suitable initiators include organic as well as inorganic initiators, although the latter are generally preferred. Exemplary organic initiators include: organic peroxide such as bissuccinic acid peroxide, bisglutaric acid peroxide, or tert-butyl hydroperoxide. Exemplary inorganic initiators include: ammonium- alkali- or earth alkali salts of persulfates, permanganic or manganic acids, with potassium permanganate preferred. A persulfate initiator, e.g. ammonium persulfate (APS), may be used on its own or may be used in combination with a reducing agent. Suitable reducing agents include bisulfites such as for example ammonium bisulfite or sodium metabisulfite, thiosulfates such as for example ammonium, potassium or sodium thiosulfate, hydrazines, azodicarboxylates and azodicarboxyldiamide (ADA). Further reducing agents that may be used include sodium formaldehyde sulfoxylate or fluoroalkyl sulfinates. The reducing agent typically reduces the half-life time of the persulfate initiator. Additionally, a metal salt catalyst such as for example copper, iron, or silver salts may be added.

The amount of the polymerization initiator may suitably be selected, but it is usually preferably from 2 to 600 ppm, based on the mass of water. The amount of the polymerization initiator is preferably small, since the smaller the amount of the polymerization initiator, the smaller the melt flow index (MFI) under a given load and temperature.

In one embodiment, the aqueous polymerization as described in U.S. Pat. No. 7,071,271 (Thaler et al.) is used. In this polymerization process partially hydrolyzed —$SO_2X$ comonomers, where X is F, Cl, or Br, are used as an emulsifier.

In one embodiment, the polymers of the present disclosure have an equivalent weight of less than 1000. The acid-functional pendant groups typically are present in an amount sufficient to result in an equivalent weight (EW) of less than 980, 800, 600, 500, or even 400

The molecular weight of the resulting polymer may be correlated to the melt flow index. In one embodiment the polymers in the —$SO_2F$ form of the present disclosure have a melt flow index at 265° C./5 kg of at least 0.01, 0.05, or even 0.1 g/10 min; and at most 50, 75, or even 100 g/10 min. As the MFI increases, generally the molecular weight decreases. This translates into good mechanical properties such as improved swelling, puncture resistance, and tensile strength.

In one embodiment, the swelling of the polymer made according to the present disclosure has a swelling that is at least 5% or even 10% lower than the swelling of an identical polymer made without using the polyfunctional monomer.

In one embodiment, the composition further comprises an additive such as manganese and/or cerium, which may be added to improve the durability of the polymer.

In one embodiment of the present invention, one or more manganese oxides, such as $MnO_2$ or $Mn_2O_3$, is added to the polymer electrolyte prior to membrane formation as disclosed in U.S. Publ. No. 2006/0063054 (Frey et al.). Typically the metal oxide is mixed well with the polymer electrolyte to achieve substantially uniform distribution. Mixing is achieved by any suitable method, including milling, kneading and the like, and may occur with or without the inclusion of a solvent. The amount of metal oxide added is typically between 0.01 and 5 weight percent based on the total weight of the final polymer electrolyte or PEM, more typically between 0.1 and 2 wt %, and more typically between 0.2 and 0.3 wt %. Factors mitigating against inclusion of excessive manganese oxide include reduction of proton conductivity, which may become a significant factor at greater than 0.25 wt % oxide.

In another embodiment, one or more cerium oxide compounds, such as $CeO_2$ or $Ce_2O_3$, but more typically $CeO_2$, is dispersed in the polymer electrolyte prior to membrane formation as described in U.S. Publ. No. 2007/0099052 (Frey et al.). The cerium oxide compound may be crystalline or amorphous. The cerium oxide compound may contain cerium in the (IV) oxidation state, the (III) oxidation state, or both. In one embodiment, the cerium oxide compound is substantially free of metallic cerium. Alternately, the cerium oxide compound may contain both cerium oxide and metallic cerium. Alternately, the cerium oxide compound may be supported as a thin oxidation reaction product layer on a metallic cerium particle. In one embodiment, the cerium oxide compound may contain substantially no other metal elements. Alternately, the cerium oxide compound may contain other metal elements and thus may be considered a mixed metal oxide compound comprising cerium oxide. Examples of mixed metal oxide compounds comprising cerium oxide include solid solutions such as zirconia-ceria and multicomponent oxide compounds such as barium cerate. Typically the cerium oxide compound is mixed well with the polymer electrolyte to achieve substantially uniform distribution. Mixing is achieved by any suitable method, including milling, kneading and the like, and may occur with or without the inclusion of a solvent. The amount of cerium oxide compound added is typically between 0.01 and 5 weight percent based on the total weight of the final polymer electrolyte or PEM, more typically between 0.1 and 2 wt %, and more typically between 0.2 and 0.3 wt %. The cerium oxide compound is typically present in an amount of less than 1% by volume relative to the total volume of the polymer electrolyte membrane, more typically less than 0.8% by volume, and more typically less than 0.5% by volume. Cerium oxide may be in particles of any suitable size, typically between 1 and 5000 nm. In some embodiments, particle sizes of 200-5000 nm are preferred. In some embodiments, particle sizes of 500-1000 nm are preferred.

In yet another embodiment, a salt of cerium is added to the acid form polymer electrolyte prior to membrane formation as disclosed in U.S. Publ. No. 2007/0099053 (Frey et al.). Typically the salt is mixed well with or dissolved within the polymer electrolyte to achieve substantially uniform distribution. As used herein, cerium salt means a compound including cerium cations wherein the positive charge of ionized cerium is balanced by an equal negative charge of an anion, excluding compounds comprising $O^{2-}$ oxygen anions as the primary counterions to the cerium cations; i.e., excluding cerium oxides. The salt may comprise any suitable anion, including chloride, bromide, hydroxide, nitrate, carbonate, sulfonate, phosphate, and acetate and the like. More than one anion may be present. Inorganic and/or organic anions may be present. Suitable cerium salts may also contain additional non-cerium organic or inorganic cations, including other metal cations or other ammonium cations, including organic ammonium cations. When cation exchange occurs between the transition metal salt and the acid form polymer, it may be desirable for the acid formed by combination of the liberated proton and the original salt anion to be removed. Thus, it may be preferred to use anions that generate volatile or soluble acids, for example chloride or nitrate. Cerium cations may be in any suitable oxidation state, including $Ce^{3+}$ and $Ce^{4+}$. Without wishing to be bound by theory, it is believed that at least a portion of the cerium cations persist in the polymer electrolyte because they are exchanged with $H^+$ ions from the anion groups of the polymer electrolyte and become associated with those anion groups. Furthermore, it is believed that polyvalent cerium cations may form crosslinks between anion groups of the polymer electrolyte, further adding to the stability of the polymer. However, in some embodiments cerium salts may be present in solid or precipitate form. In still other embodiments, cerium cations may be present in a combination of two or more forms including solvated cation, cation associated with bound anion groups of the PEM, and cation bound in a cerium salt precipitate. The amount of salt added is typically an amount which provides between 0.001 and 0.5 charge equivalents of cerium ion based on the molar amount of acid functional groups present in the polymer electrolyte, more typically between 0.005 and 0.2, more typically between 0.01 and 0.1, and more typically between 0.02 and 0.05.

In general, copolymers which contain predominantly $SO_2F$ end groups rather than $SO_3^-$ end groups are more easily melt processed, e.g. by extrusion or hot pressing into various shapes, e.g. into films or membranes. These articles may be further hydrolyzed to generate ion exchange membranes. For copolymers with increasing $SO_3^-$ end group content, solutions processing, e.g. casting films or membranes, may be more appropriate.

If the polymer comprises $SO_2F$ end groups, these end groups may be converted to sulfonic acid form by any suitable process. Sulfonyl halide groups may be converted by hydrolysis. In one typical process, the polymer is immersed in an aqueous solution of a strong base and subsequently acidified. In one typical embodiment, a polymer membrane is immersed in 15% KOH in water at 80° C. for 1 hour than washed twice in 20% nitric acid at 80 C, then boiled in deionized water twice. Sulfonyl anhydride groups may be converted by hydrolysis, with removal of remaining R—$SO_3H$.

In one embodiment, the polymer of the present disclosure is made into a film. Any suitable method of forming a film may be used. The polymer may be cast from a dispersion/ solution. Any suitable casting method may be used, including bar coating, spray coating, slit coating, brush coating, and the like. After casting, the composition may be annealed to form a more robust film.

In another embodiment, the membrane may be formed from neat polymer in a melt process such as extrusion.

In yet another embodiment, the dry polymer material in a form that is melt-processable is heated and compressed to form a block, which is then skived with a sharp blade using a process called skiving to form a continuous strip of film; such skiving technologies are used in PTFE processing.

The polymer of the present may be processed using such methods as casting may be used to generate films having a thickness of no more than 25 μm (micrometers) or even 50 μm. The polymer of the present may be processed, using such methods as extrusion and/or skiving may be used to generate a film having a thickness of at least 20 μm, 40 μm, 60 μm, 80 μm, 100 μm or even 1 millimeter.

In still another embodiment the polymer of the present disclosure is imbibed into the pores of the supporting matrix. Any suitable supporting matrix may be used. Typically the supporting matrix is electrically non-conductive. Typically, the supporting matrix is composed of a fluoropolymer, which is more typically perfluorinated. Typical matrices include porous polytetrafluoroethylene (PTFE), such as biaxially stretched PTFE webs. Overpressure, vacuum, wicking, immersion, and the like may be used to imbibe the polymer. The polymer becomes embedded in the matrix upon crosslinking.

As is known in the art, annealing is used to turn a coating into a robust, continuous solid phase film. During the formation of a film from a casting process, there is a gradual coalescence of latex particles by interdiffusion of their constituent polymer chains. The first step is the relatively rapid diffusion of short chains and chain ends, while the second, and much slower, step of interpenetration and entanglement of long chains results in greatly increased robustness of the final film. Heat is used not to cure (or cause a chemical change of the polymer), but instead to aid diffusion and entanglement of the polymer.

In one embodiment, the polymer of the present disclosure is blended with a second polymer to form a film. In one embodiment, the second polymer may be a continuous phase, while the polymer of the present disclosure is a discontinuous phase. Exemplary second polymer include: fluorinated and partially fluorinated polymers such as PTFE, poly vinylidene fluoride, and copolymers including hexafluoropropylene; aromatic backbone polymers such as poly ether ketone, and poly ether sulfone; and basic polymers such as polybenzimidazole.

The polymer of the present disclosure may be used a membrane in a fuel cell or as an electrode. PEM's manufactured from the crosslinked polymer according to the present invention may be used in the fabrication of membrane electrode assemblies (MEA's) for use in fuel cells. An MEA is the central element of a proton exchange membrane fuel cell, such as a hydrogen fuel cell. Fuel cells are electrochemical cells which produce usable electricity by the catalyzed combination of a fuel such as hydrogen and an oxidant such as oxygen. Typical MEA's comprise a PEM (also known as an ion conductive membrane (ICM)), which functions as a solid electrolyte. One face of the PEM is in contact with an anode electrode layer and the opposite face is in contact with a cathode electrode layer. Each electrode layer includes electrochemical catalysts, typically including platinum metal. Gas diffusion layers (GDL's) facilitate gas transport to and from the anode and cathode electrode materials and conduct electrical current. The GDL may also be called a fluid transport layer (FTL) or a diffuser/current collector (DCC). The anode and cathode electrode layers may be applied to GDL's in the form of a catalyst ink, and the resulting coated GDL's sandwiched with a PEM to form a five-layer MEA. Alternately, the anode and cathode electrode layers may be applied to opposite sides of the PEM in the form of a catalyst ink, and the resulting catalyst-coated membrane (CCM) sandwiched with two GDL's to form a five-layer MEA. The five layers of a five-layer MEA are, in order: anode GDL, anode electrode layer, PEM, cathode electrode layer, and cathode GDL. In a typical PEM fuel cell, protons are formed at the anode via hydrogen oxidation and transported across the PEM to the cathode to react with oxygen, causing electrical current to flow in an external circuit connecting the electrodes. The PEM forms a durable, non-porous, electrically non-conductive mechanical barrier between the reactant gases, yet it also passes H$^+$ ions readily.

Items of the disclosure include:

Item 1. A composition comprising: a polymer derived from
(a) a fluorinated olefin monomer;
(b) a highly fluorinated sulfur-containing monomer of the formula:

$$CX^1X^2=CX^3[CX^4X^5]_w—O—R^1—SO_2Y]$$

where $X^1$, $X^2$, $X^3$, $X^4$, and $X^5$ are independently selected from H, Cl, or F; w is 0 or 1; $R^1$ is a fluorinated divalent carbon-containing group, optionally comprising oxygen atoms; and Y is selected from F, Cl, Br, I, or OM where M is a cation; and
(c) a polyfunctional monomer comprising at least two functional groups, wherein the functional groups are selected from the group consisting of: (i) a fluorovinyl ether group, (ii) a fluoroallyl ether group, (iii) a fluorinated olefinic group, and (iv) combinations thereof.

Item 2. The composition of item 1, wherein the highly fluorinated sulfur-containing monomer is partially or fully fluorinated.

Item 3. The composition of any one of the previous items, wherein the highly fluorinated sulfur-containing monomer is:

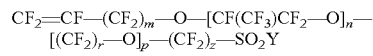

$$CF_2=CF—(CF_2)_m—O—[CF(CF_3)CF_2—O]_n—[(CF_2)_r—O]_p—(CF_2)_z—SO_2Y$$

where m is 0 or 1; n is 0-5; r is 1-9; p is 0-5, z is 1-10, and Y is selected from F, Cl, Br, I, or OM.

Item 4. The composition of any one of the previous items, wherein the highly fluorinated sulfur-containing monomer is selected from the group consisting of: $CF_2=CF—O—(CF_2)_z—SO_2F$; $CF_2=CFCF_2—O—(CF_2)_z—SO_2F$; $CF_2=CF—O—CF_2CF(CF_3)—O—(CF_2)_z—SO_2F$; and $CF_2=CFCF_2—O—CF(CF_3)CF_2—O—(CF_2)_z—SO_2F$, and hydrolyzed versions thereof, wherein z is 1-10.

Item 5. The composition of any one of the previous items, wherein the polyfunctional monomer is a perfluorodivinyl alkylether.

Item 6. The composition of item 5, wherein the a perfluorodivinyl alkylether is selected from the group consisting of: $CF_2=CF—O—(CF_2)_b—O—CF=CF_2$; $CF_2=CFCF_2—O—(CF_2)_b—O—CF_2CF=CF_2$; $CF_2=CF—CF_2—O—(CF_2)_b—O—CF=CF_2$; and $CF_2=CF—(CF_2)_m—O—R—O—(CF_2)_e—CF=CF_2$, where b is 2-10, m is 0-2, e is 0-2, and R is an aryl or fluorinated aryl.

Item 7. The composition of any one of items 1-3, wherein the polyfunctional monomer is a perfluorodiallyl alkylether.

Item 8. The composition of item 7, wherein the perfluorodiallyl alkylether is:

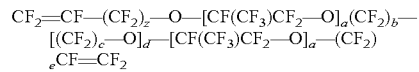

$$CF_2=CF—(CF_2)_z—O—[CF(CF_3)CF_2—O]_a(CF_2)_b—[(CF_2)_c—O]_d—[CF(CF_3)CF_2—O]_a—(CF_2)_e CF=CF_2$$

where z is 0-5; a is 0-5; b is 0-5; c is 0-5; d is 0-5, and e is 0-5; and wherein $a+b+c+d \geq 1$.

Item 9. The composition of any one of the previous items, wherein the polyfunctional monomer is a fluorinated bisolefin having the formula: $R^1R^2C=CX^6—(CF_2)_k—CX^7=CR^3R^4$, where k is 2-10; $X^6$ and $X^7$ are each independently selected from H, F, Cl, or a non-fluorinated or fluorinated methyl group; and $R^1$, $R^2$, $R^3$, and $R^4$ are each independently selected from H, Cl, or a C1-C5 alkyl group.

Item 10. The composition of any one of the previous items, wherein the polymer is derived from 5-40 mole % of the highly fluorinated sulfur-containing monomer versus the total monomer present.

Item 11. The composition of any one of the previous items, wherein the polymer is derived from 0.1-0.01 wt % of the polyfunctional monomer versus the total monomer present.

Item 12. The composition of any one of the previous items, wherein the fluorinated olefin monomer is selected from at least one of: tetrafluoroethylene, vinylidene fluoride, and hexafluoropropylene.

Item 13. The composition of any one of the previous items, wherein the composition further comprises an additive.

Item 14. The composition of item 13, wherein the additive is selected from at least one of a manganese and cerium.

Item 15. The composition of any one of the previous items, wherein the polymer is derived from an additional monomer.

Item 16. The composition of any one of the previous items, wherein the polymer has a melt flow index at 265° C./5 kg of between 0.01 g/10 min to 50 g/10 min.

Item 17. The composition of any one of the previous items, wherein the composition has an equivalent weight of less than 700.

Item 18. A composition comprising the polymer of any one of the previous items and a second polymer.

Item 19. The composition of item 19, wherein the second polymer is a continuous phase and the polymer of any one of items 1 to 17 is a discontinuous phase.

Item 20. An article comprising the composition of any one of items 1 to 17 imbibed in a support structure.

Item 21. An article comprising the composition of any one of items 1 to 17, wherein the article is a membrane or an electrode.

Item 22. The membrane electrode assembly comprising the membrane of item 21.

Item 23. A fuel cell comprising the membrane electrode assembly of item 22.

Item 24. A method comprising:
(I) providing a mixture comprising
(a) a fluorinated olefin monomer;
(b) a highly fluorinated sulfur-containing monomer of the formula:

$$CX^1X^2=CX^3[(CX^4X^5)_w-O-R^1-SO_2Y)$$

where $X^1$, $X^2$, $X^3$, $X^4$, and $X^5$ are each independently selected from H, Cl, or F; w is 0 or 1; $R^1$ is a non-fluorinated or fluorinated alkylene group; and Y is selected from F, Cl, Br, I, or OH; and
(c) a polyfunctional monomer, wherein the functional group is selected from the group consisting of (i) a fluorovinyl ether group, (ii) a fluoroallyl ether group, (iii) a fluorinated olefinic group, and (iv) combinations thereof; and
(II) polymerizing the mixture to form a polymer.

Item 25. The method of item 24, further comprising converting the polymer into a membrane.

Item 26. The method of any one of items 24-25, wherein the converting is selected from at least one of a casting process, an extrusion process, and a skiving process.

Item 27. The method of any one of items 24-25, further comprising forming the polymer into a cylinder then contacting the polymer with a blade thereby removing a layer of polymer to form a thin sheet of film.

EXAMPLES

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated.

All materials are commercially available, for example from Sigma-Aldrich Chemie GmbH; Steinheim, Germany, or Merck KGaA, Darmstadt, Germany, or known to those skilled in the art unless otherwise stated or apparent.

These abbreviations are used in the following examples: g=gram, kg=kilograms, min=minutes, mol=mole; cm=centimeter, mm=millimeter, ml=milliliter, L=liter, psi=pressure per square inch, MPa=megaPascals, and wt=weight.

Materials $CF_3-O-(CF_2)_3-O-CFH-CF_2-COONH_4$, an emulsifier, was prepared as described in U.S. Pat. No. 7,671,112 (Hintzer et al.) as Compound 11.

$CF_2=CF-O-(CF_2)_4-SO_2F$, perfluoro-5-oxa-hept-6-ene sulphonic acid fluoride (MV4S), was prepared as described in U.S. Pat. No. 6,624,328 (Guerra), the disclosure of which is incorporated herein by reference.

600 g MV4S was pre-emulsified into 396 g of water with the addition of 4 g of $CF_3-O-(CF_2)_3-O-CFH-CF_2-$ COONH$_4$ over 10 minutes under high shear conditions (24,000 rpm, using a mixer available under the trade designation "ULTRA-TURRAX MODEL T 25 DISPERSER" available from IKA-Werke GmbH & Co. KG, Staufen, Germany). The particle size of the dispersion was approximately 1500 nanometers.

$CF_2=CF-O-(CF_2)_3-O-CF=CF_2$, perfluoro-3,7-dioxa-1,8-nonadiene (M-302-2V), was obtained from Anles, St. Petersburg, Russia.

60 g M-302-2V was pre-emulsified into 39.6 g of water with the addition of 0.4 g of $CF_3-O-(CF_2)_3-O-CFH-CF_2-COONH_4$ over 10 minutes under high shear conditions (24,000 rpm, using a mixer available under the trade designation "ULTRA-TURRAX MODEL T 25 DISPERSER" available from IKA-Werke GmbH & Co. KG, Staufen, Germany) The particle size of the dispersion was approximately 1500 nanometers.

Methods

Equivalent Weight

The equivalent weight (EW) of polymer samples was determined by using $^{19}F$ Solid State NMR Spectroscopy (available from Varian, Inc., Palo Alto, Calif. under trade designation "INOVA 400 WB" equipped with a 3.2 mm MAS probe) from the ratio of peak areas at different chemical shifts.

Melt Flow Index

Melt flow index (MFI) was measured according to ISO 12086 (December 1985), using a standardized extrusion die of 2.1 mm diameter and 8 mm length at 265° C. and a 5 kg load.

Proton Conductivity

Proton conductivity was measured by electrochemical impedance spectroscopy with a four-probe test clamp. A sample of Comparative Example B and Example 2 were each mounted into a test holder (BekkTech, BT-112 Conductivity Cell, obtained from Schribner Associates, Inc., Southern pines, N.C.) and then connected to a fuel cell test station to supply heat and humidified air. An AC signal (amplitude 100 milliAmpheres, 0.1 Hertz<frequency between 0.1 Hertz to 20 kiloHertz) was applied by an electrochemical test station (Solartron 1280 C, obtained from Solartron Analytical, UK) and the resistance was measured by the resulting voltage drop. By increasing cell temperature at constant dew point, different relative humidities were realized. The proton conductivity measured in mS/cm (milliSiemens/centimeter) was plotted as a function of relative humidity.

Mechanical Properties

The E-modulus of the membrane as a function of relative humidity was measured by Dynamic-Mechanical-Analysis DMA (Triton DMA-200, obtained from Triton Technologies, Ltd., UK). An oscillating sine wave force with defined displacement amplitude (defined as percentage from the initial sample length, 1.25%) and frequency (1 Hertz) was applied to the sample. By measuring amplitude of strain and phase shift at 80 C and as a function of relative humidity, the storage modulus E' was calculated.

Swelling

Samples from Comparative Example B and Example 2 were formed into sheets (e.g. films) having a rectangular shape. Major planar dimensions (x and y directions) of each sheet and the thickness were measured using a digital Vernier Caliper. Each polymer sample was then soaked in deionized water for 4 hours at 80° C. The soaked sample was removed and the same major planar directions (x and y) were re-measured along with thickness using a digital Vernier Caliper. Swelling is reported as the dimensional changes in the x and y direction and in thickness.

Example 1

Under oxygen-free condition a 4 liter kettle was charged with 1900 mL deionized water. 12 g $CF_3$—O—$(CF_2)_3$—O—CFH—$CF_2$—COONH$_4$, 1 g oxalic acid dihydrate and 5 g ammonium oxalate monohydrate were added. After heating to 50° C. 100 g tetrafluoroethene (TFE), 61 g perfluoro-5-oxa-hept-6-ene sulphonic acid fluoride ($CF_2$=CF—O—$(CF_2)_4$—$SO_2F$, MV4S) as preemulsion (described in US Patent Publication 2006-0014887), and 0.5 g perfluoro-3,7-dioxa-1,8-nonadiene ($CF_2$=CF—O—$(CF_2)_3$—O—CF=$CF_2$, M-302-2V) as preemulsion were added. The reaction was initiated with addition of 0.8 g potassium permanganate ($KMnO_4$) dissolved in 400 mL deionized water. At 6 MPa pressure and 50° C., 500 g TFE, 660 g MV4S (as preemulsion), and 6 g M-302-2V (as preemulsion) were fed over a period of 230 min. The resulting latex had a solid content of 25% and was coagulated via freeze coagulation. The washed polymer was dried at 115° C.

The composition of the resulted polymer was 0.3 mole % $CF_2$=CF—O—$(CF_2)_3$—O—CF=$CF_2$, 20.8 mole % MV4S, 78.9 mole % TFE, equivalent weight of 764, MFI (265° C./5 kg)=0.1 g/10 min.

Example 2

The coagulated polymer from Example 1 was sintered at 200° C. and a pressure of 30 MPa. After 4 hours a transparent cylinder was formed. The cylinder was skived by a turning lathe at 20 revolutions per minute. A film having about 60 micron thickness was obtained. The film was then chemically converted into the acid form by exposure to an aqueous solution of KOH and 1-methoxy 2-propanol using a procedure similar to that described in U.S. Pat. No. 5,310,765 (Banerhee et al.).

Comparative Example A

The same procedure as described in Example 1 was used except that 800 g MV4S was fed and no M-302-2V was used.

The composition of the resulted polymer was 25.1 mole % MV4S, 74.9 mole % TFE having; equivalent weight of 679 and MFI (265° C./5 kg)=360 g/10 min.

Comparative Example B

A casting solution containing 20 wt % solid polymer of Comparative Example A by dissolving it in an azeotropic mixture of N-propanol and water (at a weight ratio of about 70:30). A portion of the casting solution was placed onto a polyimide film (obtained from E.I. du Pont de Nemours and Company, Wilmington, Del. under the trade designation "KAPTON") liner using a polyethylene pipette. The liner film with the casting solution was pushed at constant speed through a film casting knife (Model PA-2327, obtained from Byk-Gardner, Columbia, Md.) to from a coating from the casting solution. The coating was dried at 80° C. for 30 min and then annealed at 180° C. for 10 min in an oven with circulating air to form a membrane film. Before testing, the membrane film was removed from the "KAPTON" liner with a pair of tweezers. The standard thickness of finished membrane films used was 30 μm, unless otherwise stated.

The conductivity as a function of relative humidity was tested on Example 2 (Ex 2) and Comparative Example B (CE B). Shown in FIG. 1 is the conductivity versus relative humidity.

Figure 2:
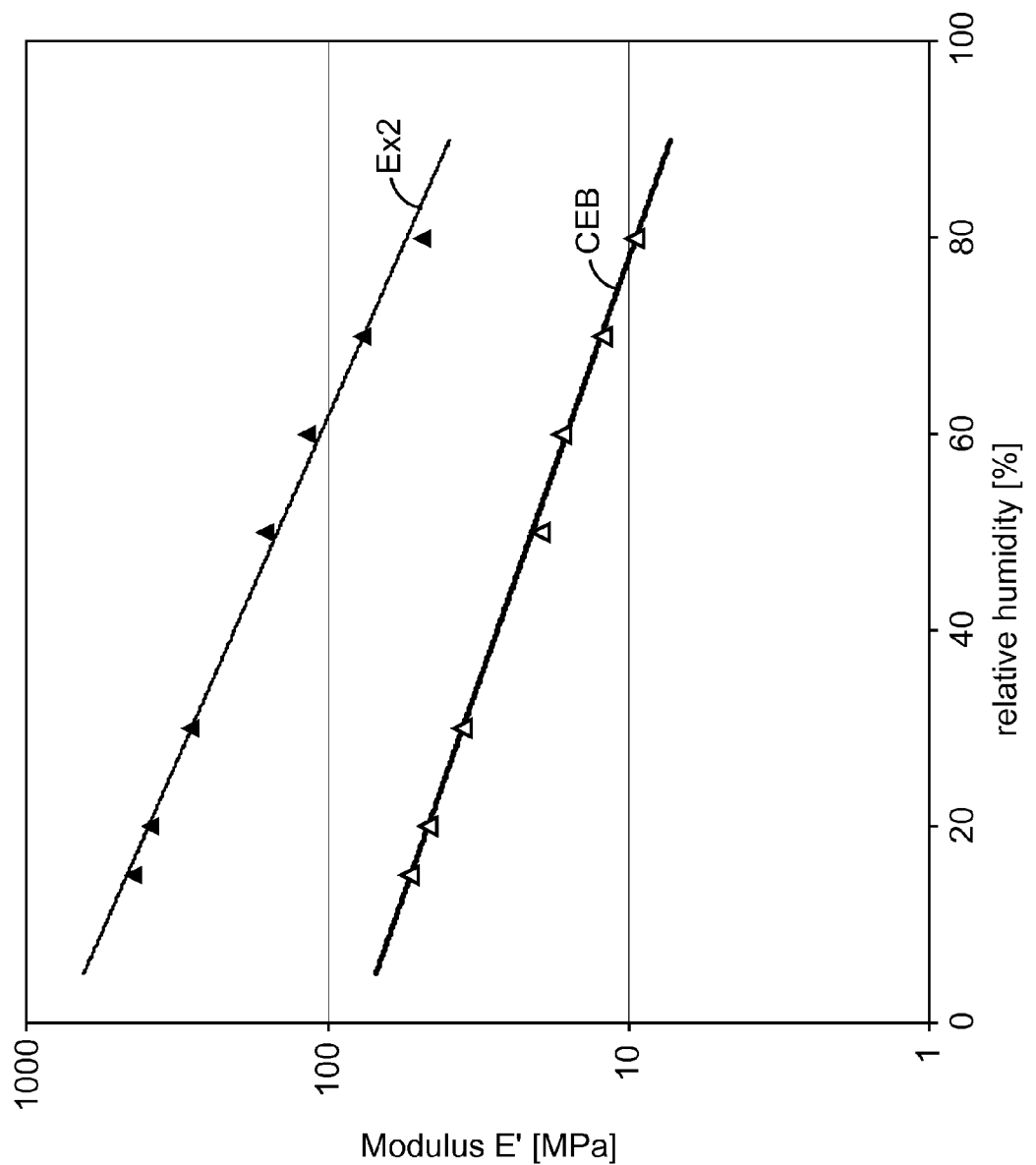
FIG. 2 illustrates a graph of modulus E' versus relative humidity at 80° C. for Example 2 and Comparative Example B.

The modulus E' in MPa versus % relative humidity at 80° C. was tested on Example 2 and Comparative Example B. The results are shown in FIG. 2.

Example 2 and Comparative Example B (made at 20 μm and at 30 μm thickness) were tested for swell. The results are shown in the table below.

|  | % dimensional change | |
| --- | --- | --- |
|  | x-y axis | thickness |
| Example 2 (60 μm) | 18.30 | 10.20 |
| Comparative Example B (20 μm) | 26.70 | 19.58 |
| Comparative Example B (30 μm) | 27.20 | 24.78 |

Comparative Example C

A polymer comprising TFE and MV4S was prepared as described in U.S. Pat. No. 7,348,088 (Hamrock et al.) but $CF_3$—O—$(CF_2)_3$—O—CFH—$CF_2$—COONH$_4$ was used as an emulsifier. The composition of the resulted polymer was 20.2 mole % MV4S, 79.2 mole % TFE having an EW of 775. The MFI (265° C./5 kg)=150 g/10 min.

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. A composition comprising: a polymer derived from
   (a) a fluorinated olefin monomer;
   (b) a highly fluorinated or perfluorinated sulfur-containing monomer of the formula:

$CX^1X^2$=$CX^3[(CX^4X^5)_w$—O—$R^1$—$SO_2Y]$ where each $X^1$, $X^2$, $X^3$, $X^4$, and $X^5$ is independently selected from H, Cl, or F; w is 0 or 1; $R^1$ is a fluorinated divalent carbon-containing group, optionally comprising oxygen atoms; and Y is selected from F, Cl, Br, I, or OM, where M is a cation, wherein highly fluorinated refers to a compound wherein at least 75% of the C—H bonds are replaced by C—F bonds and perfluorinated refers to a compound wherein all C—H bonds are replaced by C—F bonds; and
   (c) a polyfunctional monomer comprising at least two functional groups, wherein the at least two functional groups are selected from: (i) at least two fluorovinyl ether groups, (ii) at least two fluoroallyl ether groups, (iii) a fluorovinyl group and a fluorinated olefinic group, (iv) a fluoroallyl ether group and a fluorinated olefinic group, (v) a fluorovinyl ether group and a fluoroallyl ether group, and (vi) combinations thereof.

2. The composition of claim 1, wherein the highly fluorinated or perfluorinated sulfur-containing monomer is selected from the group consisting of: $CF_2$=CF—O—$(CF_2)_z$—$SO_2F$; $CF_2$=CFCF$_2$—O—$(CF_2)_z$—$SO_2F$; $CF_2$=CF—O—CF$_2$CF(CF$_3$)—O—$(CF_2)_z$—$SO_2F$; and $CF_2$=CFCF$_2$—O—CF(CF$_3$)CF$_2$—O—$(CF_2)_z$—$SO_2F$, and hydrolyzed versions thereof, wherein z is 1-10.

3. The composition of claim 1, wherein the polyfunctional monomer is a perfluorodivinyl alkylether, optionally selected from the group consisting of: $CF_2$=CF—O—

$(CF_2)_b$—O—CF=CF$_2$; CF$_2$=CFCF$_2$—O—$(CF_2)_b$—O—CF$_2$CF=CF$_2$; CF$_2$=CF—CF$_2$—O—$(CF_2)_b$—O—CF=CF$_2$; and CF$_2$=CF—$(CF_2)_m$—O—R—O—$(CF_2)_e$—CF=CF$_2$, where b is 2-10, m is 0-2, e is 0-2, and R is an aryl or fluorinated aryl.

4. The composition of claim 1, wherein the polyfunctional monomer is a perfluorodiallyl alkylether, optionally selected from

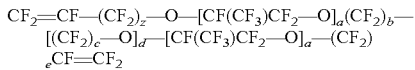
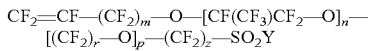

where z is 0-5; a is 0-5; b is 0-5; c is 0-5; d is 0-5, and e is 0-5; and wherein a+b+c+d≥1.

5. The composition of claim 1, wherein the composition has an equivalent weight of less than 700.

6. The composition of claim 1, wherein the highly fluorinated or perfluorinated sulfur-containing monomer is:

CF$_2$=CF—$(CF_2)_m$—O—[CF(CF$_3$)CF$_2$—O]$_n$—[(CF$_2$)$_r$—O]$_p$—$(CF_2)_z$—SO$_2$Y where m is 0 or 1; n is 0-5; r is 1-9; p is 0-5, z is 1-10, and Y is selected from F, Cl, Br, I, or OM.

7. The composition of claim 1, wherein the polyfunctional monomer is at least one of perfluorodiallyl alkylether and a perfluorodivinyl alkylether.

8. The composition of claim 1, wherein the polymer is derived from 5-40 mole % of the highly fluorinated sulfur-containing monomer versus the total monomer present.

9. The composition of claim 1, wherein the polymer is derived from 0.1-0.01 wt % of the polyfunctional monomer versus the total monomer present.

10. The composition of claim 1, wherein the fluorinated olefin monomer is selected from at least one of: tetrafluoroethylene, vinylidene fluoride, and hexafluoropropylene.

11. The composition of claim 1, wherein the polymer is derived from at least 0.5 mol % and at most 12 mol % of the polyfunctional monomer versus the total monomer present.

12. The composition of claim 1, wherein the composition further comprises an additive, wherein the additive is selected from at least one of a manganese and cerium.

13. The composition of claim 1, wherein the polymer has a melt flow index at 265° C./5 kg of between 0.01 g/10 min to 50 g/10 min.

14. The composition of claim 1, wherein the polymer is derived from at least 65 mole % Of the fluorinated olefin monomer.

15. An article comprising the composition of claim 1, wherein the article is a membrane or an electrode.

16. The membrane electrode assembly comprising the membrane of claim 15.

17. A fuel cell comprising the membrane electrode assembly of claim 16.

18. A method comprising:
(I) providing a mixture comprising
  (a) a fluorinated olefin monomer;
  (b) a highly fluorinated or perfluorinated sulfur-containing monomer

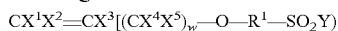

where X$^1$, X$^2$, X$^3$, X$^4$, and X$^5$ are each independently selected from H, Cl, or F; w is 0 or 1; R$^1$ is a non-fluorinated or fluorinated alkylene group; and Y is selected from F, Cl, Br, I, or OM, where M is a cation wherein highly fluorinated refers to a compound wherein at least 75% of the C—H bonds are replaced by C—F bonds, and perfluorinated refers to a compound wherein all C—H bonds are replaced by C—F bonds; and
  (c) a polyfunctional monomer, comprising at least two functional groups, wherein the at least two functional groups are is selected from: (i) at least two fluorovinyl ether groups, (ii) at least two fluoroallyl ether groups, (iii) a fluorovinyl group and a fluorinated olefinic group, (iv) a fluoroallyl ether group and a fluorinated olefinic group, (v) a fluorovinyl ether group and a fluoroallyl ether group, and (vi) combinations thereof; and
(II) polymerizing the mixture to form a polymer.

19. The method of claim 18, further comprising converting the polymer into a membrane.

* * * * *

UNITED STATES PATENT AND TRADEMARK OFFICE
CERTIFICATE OF CORRECTION

PATENT NO. : 9,711,816 B2
APPLICATION NO. : 14/234464
DATED : July 18, 2017
INVENTOR(S) : Kai Helmut Lochhaas It is certified that error appears in the above-identified patent and that said Letters Patent is hereby corrected as shown below:

In the Specification

Column 5,
Line 55, delete "R'," and insert -- $R^1$, --, therefor.

Column 6,
Line 4, delete "$CF_2$=CF—" and insert -- $CF_2$=CF-O- --, therefor.

In the Claims

Column 18,
Line 5, in Claim 14, delete "Of" and insert -- of --, therefor.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*